R. R. HITT.
BOLL WEEVIL CATCHER.
APPLICATION FILED JULY 19, 1916.

1,267,224.

Patented May 21, 1918.
2 SHEETS—SHEET 1.

Witness
R. K. Stevens
N. A. Minnett

Inventor
Reed R. Hitt.
By John Louis Waters & Co.
Attorney

R. R. HITT.
BOLL WEEVIL CATCHER.
APPLICATION FILED JULY 19, 1916.
1,267,224.
Patented May 21, 1918.
2 SHEETS—SHEET 2.
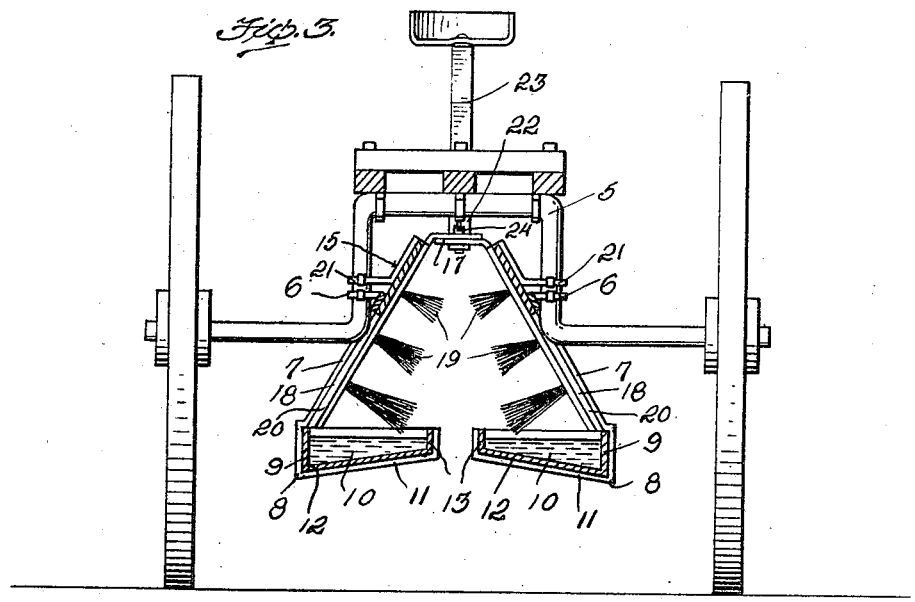
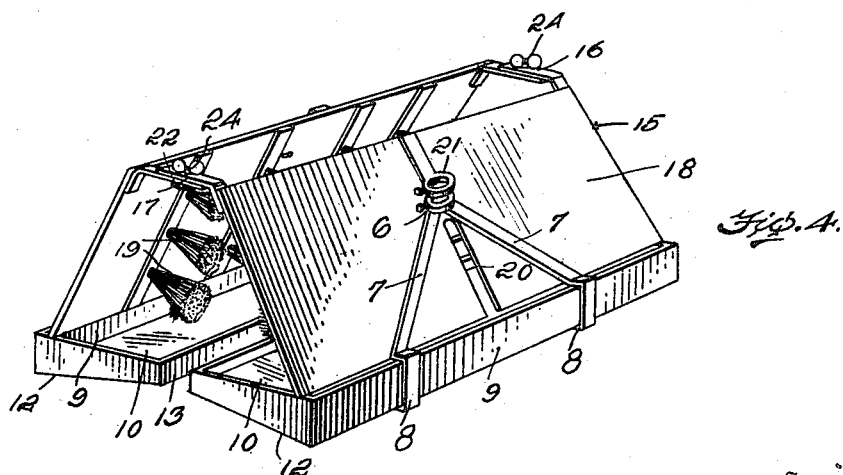
Witness
R. K. Stevens
N. A. Minnett
Inventor
Reed R. Hitt
By John Louis Waters & Co.
Attorney

UNITED STATES PATENT OFFICE.

REED R. HITT, OF ENERGY, TEXAS, ASSIGNOR TO JOHN J. URQUHART, GEORGE W. McCLELLAN, AND HENRY B. JOHNSON, ALL OF SAN SABA, TEXAS.

BOLL-WEEVIL CATCHER.

1,267,224.  Specification of Letters Patent.  Patented May 21, 1918.

Application filed July 19, 1916. Serial No. 110,243.

*To all whom it may concern:*

Be it known that I, REED R. HITT, a citizen of the United States, residing at Energy, in the county of Comanche and State of Texas, have invented certain useful Improvements in Boll-Weevil Catchers, of which the following is a specification, reference being had therein to the accompanying drawing.

The present invention comprehends generally improvements in that class of inventions known as fishing and trapping, and more particularly has reference to a boll weevil catcher.

As the primary aim and object this invention contemplates the provision of a device of the above mentioned character which is capable of being readily attached to a cultivator and disposed so as to catch the boll weevil during the cultivation of the cotton, there being provided means for removing the boll weevil from the growing cotton and for directing them into reservoirs or receiving pans, as the cultivator is drawn across the field.

It is an additional object of the present invention to provide a device of the above mentioned character wherein two boll weevil receiving pans of a novel construction are employed in conjunction with adjustable and detachable means for suspending the pans from the arch support of the cultivator in such a manner as to present the pans one upon each side of the growing cotton so that the boll weevil will be shaken therefrom into the pans as the cultivator is drawn across or through the field.

As a further improvement this invention consists in the provision of a device of the above mentioned character designed for attachment to the arch support of the cultivator so that the same may be adjusted vertically as a unit thereon or else adjusted laterally as two sections.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Fig. 3 is a transverse section taken on line 3—3 of Fig. 2, and

Fig. 4 is a perspective view of the complete device detached.

Similar characters of reference are employed in all of the above described views, to indicate corresponding parts.

Figure 1:
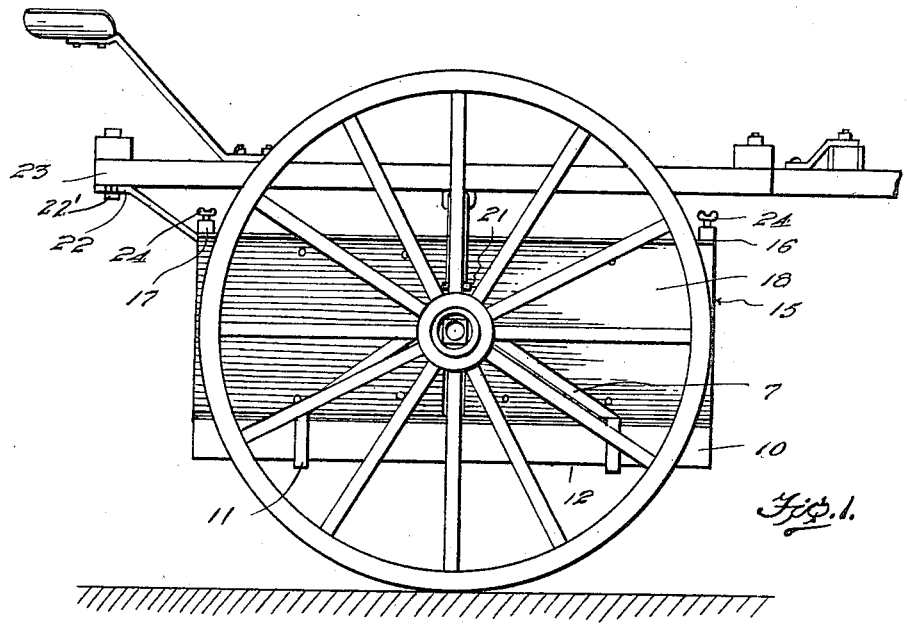
Figure 1 is a side elevation of the invention.

Referring now, more particularly, to the accompanying drawings there is illustrated the arch member 5 of a cultivator frame, to the sides of which are connected the improved hangers each embodying a clamp 6 from which extends a pair of inclined and diverging suspending arms 7. The lower ends of the arms are offset adjacent the bend to provide recesses 8 for receiving the outer side 9 of one of the receiving pans 10. Upwardly inclined arms 11 continue from the arms 7 and conform to the bottom of the adjacent pan so as to effectively support the pan.

Figure 2:
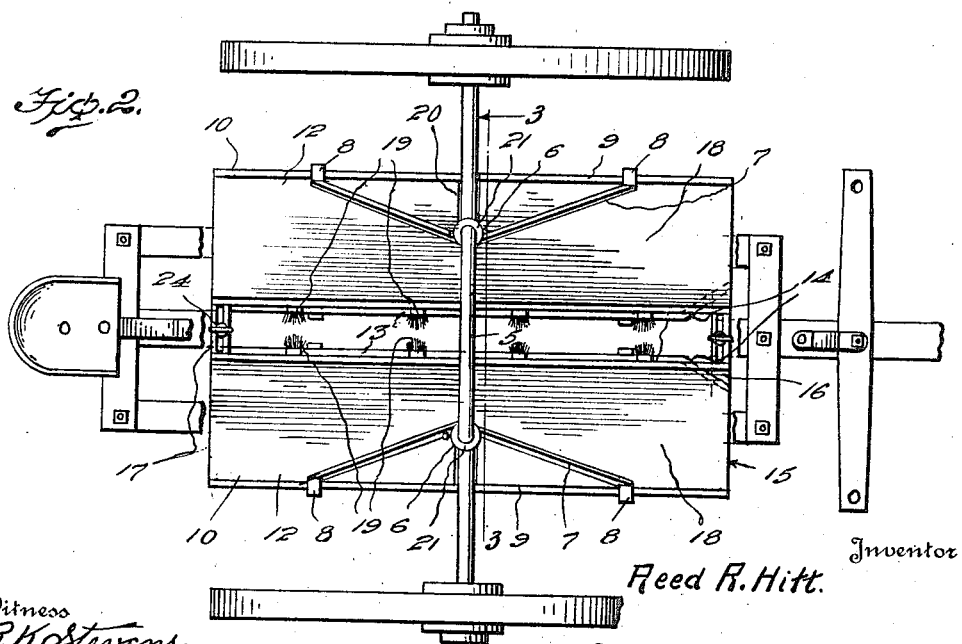
Fig. 2 is a top plan view thereof.

Each pan 10 is formed with the inclined bottom 12, the short and upwardly inclined inner wall 15, which at its forward end, as at 14 is provided with the divergent short wall. When these pans are positioned as illustrated in Fig. 2, the walls 13 are spaced longitudinally and provide for the passage therebetween of the growing cotton.

To assure of the exterminating of the boll weevil, it is desired that the pans be adapted to contain a liquid, such as kerosene or a mixture of kerosene and water so as to assure of killing of the boll weevils subsequent to depositing them in the pans.

As intimated improved boll weevil brushing and guiding means have been employed for assuring of the depositing of the boll weevils in the receiving pans 10 and this means is indicated generally by the numeral 15 consisting primarily of the two angle bars 16 and 17, to the outer portions of which are connected plates or boards 18, supported by the bars so as to be disposed in diverged relation from the bars and toward the ground.

Carried at suitable spaced intervals and vertically of the inner surfaces of the plates are a plurality of brushes 19, the bristles of each tuft of which gradually increases in length from the top to the bottom. Each plate 18 is formed medially of its ends and vertically thereof with a slot 20 for accommodating the adjacent side of the arch 5 so that the hangers carried by the outer surfaces of the plates and embodying the clamps 21 may be arranged on the sides of the arch member 5 above the clamps 6 for the supporting of the brushing and guiding means vertically of the side portions and with the clamps 6. By this arrangement it is of course apparent that the entire device may be adjusted vertically as a unit. A connecting member 22 is employed for connecting the free portions of one of the bars 17 to the seat support 23 of the cultivator. The device is shown in a position that is desirable in a majority of cases, however it will be appreciated that when it is desired to adjust the brushing, guiding and receiving means, vertically as a unit, the fastening device 22' of the connecting member may be loosened to consequently permit of movement of the guiding member.

In order to adjust the opposed sets of plates and pans laterally with respect to each other, the free outer portions of the bars 16 and 17 are each provided with the adjusting devices 24, by means of which the plates 18 as well as the hangers embodying the arms 7 may be adjusted relatively to each other. It is also apparent that by means of the clamps 6 and 21 the present device may be adjusted vertically, as a unit according to the plants acted upon.

In actual practice it has been found expedient to manufacture the plates 18 of exceedingly light or thin wood or sheet metal.

It is believed that in view of the foregoing description that a further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

What is claimed as new is:—

1. A boll weevil catcher including a pair of vertically adjustable hangers each consisting of attaching clamps, a pair of inclined and divergent suspending arms having recesses therein, and a pair of upwardly inclined arms extending from the suspending arms, longitudinally spaced receiving pans supported on the upwardly inclined arms and in the recesses, opposed plant brushing and boll weevil guiding means adjustably mounted above the receiving pans and adjustable with the hangers, and means whereby the brushing and guiding means may be adjusted laterally of each other.

2. A boll weevil catcher including a pair of hangers consisting of attaching clamps, a pair of inclined and diverging suspending arms having recesses therein, and upwardly inclined arms continuing from the diverging arms, pans supported on the upwardly inclined arms and in the recesses and maintained in longitudinally spaced relation with each other, a pair of opposed boll weevil guiding plates arranged in divergent relation with each other and adjacent the hangers, plant brushing means carried by the adjacent faces of the plates, supporting means for the plates and adjustable with the clamps so that the device may be adjusted vertically as a unit, and means for adjustably connecting the upper edges of the plates so as to maintain the opposed sets of plates and pans in various positions of lateral adjustment relative to each other.

3. A boll weevil catcher including a frame having an arch, a pair of hangers each consisting of a clamp adjustable vertically on the sides of the arm, downwardly inclined and diverging suspending arms projecting from the clamp and having recesses therein, upwardly inclined arms continuing from the suspending arms, opposed receiving pans supported on the inwardly inclined arms and in the recesses and maintained in longitudinally spaced relation with each other, a pair of opposed boll weevil guiding plates provided with vertical slots medially of the ends thereof for accommodating the sides of the arch, another pair of hangers one of each of which is secured to the outer surface of the adjacent plate and embodies a clamp for vertical adjustable engagement on the adjacent side of the arch above the clamp of the other adjacent clamp, said last mentioned hangers maintaining the plates in opposed divergent relation with each other above the pans in a manner that they may be adjusted with the pans and first mentioned hangers as a unit, brushes carried by the adjacent inner faces of the plates, angle bars carried by the upper edges of the plates, and means whereby the angle bars may be adjustably connected so as to maintain the plates in various positions of lateral adjustment relative to each other.

In testimony whereof I affix my signature.

REED R. HITT.